United States Patent [19]

Drogin, deceased

[11] Patent Number: 4,851,854

[45] Date of Patent: Jul. 25, 1989

[54] MEMORY INTENSIVE IMAGE SORTER AND METHOD

[75] Inventor: Edwin M. Drogin, deceased, late of Dix Hills, N.Y., by Louise S. Drogin, administrator

[73] Assignee: Eaton Corporation, Cleveland, Ohio

[21] Appl. No.: 60,277

[22] Filed: Jun. 10, 1987

[51] Int. Cl.$^4$ .......................... G01S 5/02; G01S 7/36; H04K 3/00; G06K 15/00
[52] U.S. Cl. ..................................... 342/417; 342/13; 342/20; 364/423; 364/514; 364/516; 364/517
[58] Field of Search ................... 342/13, 20, 417, 451; 364/514–517, 423, 578

[56] References Cited

U.S. PATENT DOCUMENTS 4,025,920  5/1977  Reitboeck et al. ..................... 342/13
4,217,580  8/1980  Lowenschuss ......................... 342/13

OTHER PUBLICATIONS

Millman, "Microelectronics-Digital and Analog Circuits and Systems", ©1979, pp. 286–288.

Primary Examiner—Theodore M. Blum
Assistant Examiner—Gregory C. Issing
Attorney, Agent, or Firm—C. H. Grace

[57] ABSTRACT

An image sorting system such as an airborne defense system for receiving and classifying enemy radar signals according to frequency, azimuth angle of arrival, etc. It employs a RAM that is addressed by the frequency and azimuth values of each received signal. If the addressed storage location in the RAM is empty, a number is assigned and stored there to represent the radar that is producing the received signals. The RAM represents a map of the aircraft's environment. Hash addressing, chaining of overlapping radar signals, pipelining to facilitate the blocking of superfluous pulse Doppler signals, etc. enable rapid reliable sorting and identification of hundreds of radar or other signals in the area.

21 Claims, 3 Drawing Sheets

MEMORY INTENSIVE IMAGE SORTER AND METHOD

FIELD

The invention relates to systems for receiving information characterizable as images of objects, and classifying or mapping it according to its parameters. For example, an image processing robot identifies objects in its environment and performs in reaction to them.

As another example, a military aircraft that receives radar signals from a great number of hostile transmitters can sort the received signals in accordance with the parameters (a) the radio frequency of each signal and (b) the azimuth direction from which it was received. With proper sorting, the directions of the various transmitters, and information as to which group of signals came from each transmitter, can be ascertained. The aircraft can then react by emitting jamming signals and by other tactics.

BACKGROUND

The scope of the present invention contemplates "objects" in a multi-dimensional space, which are characterized by vectors or parameter samples received by sensors. The invention sorts the images of the objects. The example employed here to illustrate the invention is a tactical, self-protection electronic warfare system for an airborne vehicle such as an aircraft or missile, which must react to many signals from weapon-directing radars, etc., often within a few seconds. The term vehicle as used herein means any movable platform or device including apparatus that is land-based and otherwise.

An integrated electronic countermeasures system on an aircraft ordinarily includes a radar warning system having great bandwidth for receiving and analyzing hostile radar and other signals. Under some conditions the aircraft may be receiving signals from hundreds of active search or acquisition radar beams. The airborne radar warning system attempts to classify the emitters that are transmitting the beams, by analyzing the received signals, and to prioritize the emitters according to the seriousness or urgency of the threat that each may represent. It then responds appropriately, by jamming, launching flares, deploying chaff, and maneuvering defensively.

A radar warning system often has three major sections, namely:

(a) a "receiving system", comprising directional antennas, receivers and encoders, which measure the direction, frequency, time of arrival, and other parameters of received signals, (b) a signal "preprocessor" that performs pulse sorting, histogramming, and tracking, for organizing the information about the signals in accordance with their parameters and previously received information, and (c) a data processor ("postprocessor") for central computing, which utilizes the sorted and organized signal information tactically.

As used in the aircraft defense system example, the present invention is a preprocessor as in paragraph (b) above.

PRIOR ART

Relatively stringent requirements for object sorting occur in the field of electronic warfare. For example, a modern aircraft environment, detected by an airborne wideband receiver, might consist of as many as five million RF envelope pulses per second from as many as 500 emitters such as radar sets. Emitter signals might be clustered in specific RF regions and in certain azimuth or elevation sectors. To avoid "splitting" emitters when they are classified, it is desirable to treat this environment as a whole, and to sort, identify, and locate emitters, in real time, as soon as enough pulses have been gathered from each emitter to do so.

A "pulse descriptor word" (PDW) is a data word that contains information regarding important parameters of a received signal. The parameters may include carrier frequency, azimuth angle of arrival, time of arrival, pulse width, etc. that are measured ("encoded") by the receiving system.

The conventional approach has been to attempt to group all of the PDWs from each emitter in a file. As new PDWs arrive and are encoded by the receiving apparatus, the file must be searched to ascertain where (in which "bin") they belong. If this file is part of the data memory of a conventional von Neumann organized, programmable digital computer, the computing "power" required is very great. It is given by $E \times P \times E/2 = \frac{1}{2} E^2 \times P$, where the number of emitters is E, and the average pulse rate per emitter is P. On the average, half the file has to be searched to find a match to each PDW, hence the E/2 factor.

If the file has only one dimension, such as carrier frequency (RF), and is arranged in size order (for example, in order of increasing RF) the search rate can be reduced, by performing a binary search to $E \times P \times \log_2 E$.

The rate can be expressed instead as an instruction rate. For example, assume that two fetches from memory (upper and lower limits of RF) and two subtractions or comparisons must be made for each emitter entry. The rate of instructions required per second is thus $2 \times E^2 \times P$ (or $4 E \times P \times \log_2 E$ if the search is binary), plus additional instructions to compare other parameters when a match is found and when there is overlap between nearly-matching emitters. For the numerical example at hand, (i.e., 500 emitters radiating a total of 5 million pulses/second), the required instruction rate (even with a binary search) is greater than 180 million instructions/second (MIPS).

However, in dense environments, comparisons based on two or more dimensions, such as RF and azimuth, are essential, and there may be many overlaps of objects in any one dimension, precluding ordering of the file. Moreover, when new emitter signals arrive the file has to be reordered, which increases the necessary processing rate capability.

Because of these requirements, which are imposed by modern dense signal environments, the U.S. Department of Defense has funded the development of new devices called WAMs and CAMs (window addressable memories and content addressable memories), as part of a very high speed integrated circuit (VHSIC) program. These are merely single instruction multiple data array machines of an elementary type, and are intended for use in highly logic-intensive or computation-intensive systems.

For example, each WAM device stores upper and lower limit values for RF and Az for a few emitters and compares each PDW with all stored entries in parallel. A large array of such devices is required to handle 500 emitters, and all PDWs are broadcast to the array. The computing speed required is $E^2 \times P$ operations per second (2.5 billion operations per second for the example). This high speed is achieved by providing many parallel comparators, which operate at high clock rates. Each device consumes a great amount of power and many of these expensive devices are required to handle a large number of emitters, such as the 500 emitters of the present example.

While it is not obvious, it is possible to duplicate the performance of a WAM or CAM array of devices by means of a random access memory (RAM): that is the subject of the present invention.

SUMMARY

The present invention permits a processing rate that for most situations is much lower than with other methods and therefore easier to accomplish.

When a RAM is employed to map the environment in multiple dimensions, the sorting task is reduced to reading and writing into the RAM at a total rate proportional to $E \times P$ and considerably less than $2 \, E \times P$. For example, the address of each word in RAM can represent a "pixel" or rectangle having fixed boundaries in radio frequency (RF) and azimuth (Az). Each bit of address is one dimensional size of a pixel. Each word stored in a pixel of the RAM involves a binary code (e.g., having at least 9 bits to designate one of 512 emitter signals), that "points directly to" the correct emitter file entry. The word stored in the pixel identifies an emitter, thereby obviating any need for a search.

Once the environment has been mapped in the RAM, the correct emitter file entries are continually accessed by running through the RAM at a rate $E \times P$. Of course, many problems had to be solved to ensure that the environment will be appropriately distributed in the mapping space and that the RAM can be loaded in real time even when pulse data enter the preprocessor at a very high peak rate. The solutions are described below in detail.

DETAILED DESCRIPTION

Figure 1:
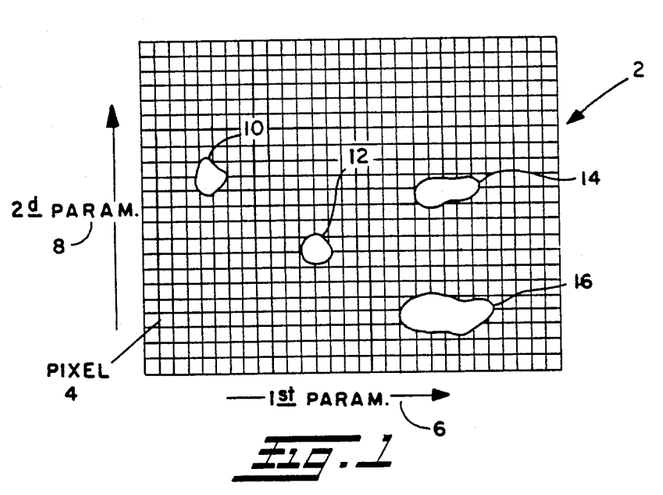
FIG. 1 shows the concept of mapping of objects in a real or figurative multi-dimensional "space", in terms of two or more parameters of each of the objects.

In FIG. 1 a two-dimensional space is represented by an array, designated by reference numeral 2, of pixels, such as pixel 4. The horizontally spaced-apart vertical of each pixel are indicative of differing values of a first parameter 6, and the vertically spaced-apart horizontal lines are indicative of the values of a second parameter 8. Objects 10, 12, 14, and 16 in the space are characterized by values of the first and second parameters as mapped in FIG. 1. Each object in this illustration occupies all or part of more than one pixel, but in a practical mapping situation pixels are not fractionated.

Figure 2:
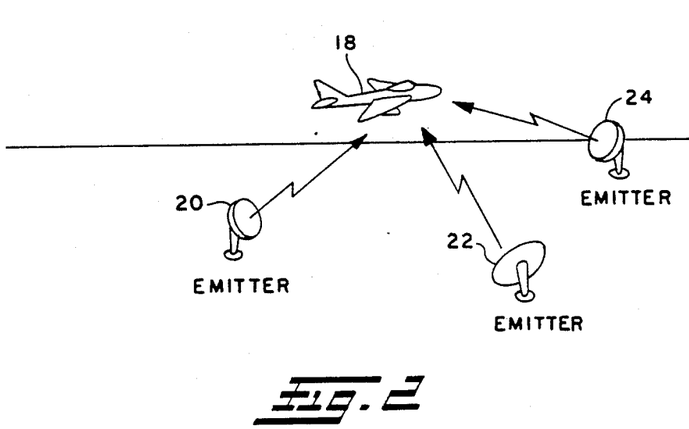
FIG. 2 depicts an example of the invention involving an aircraft equipped with electronic warfare apparatus receiving electromagnetic signals from enemy transmitters.

FIG. 2 provides background for the electronic warfare situation, which is employed as an example of the many applications of the present invention. An aircraft 18 flies in an electromagnetic signal environment that includes radar signals from three ground-based transmitters or "emitters" 20, 22 and 24.

A radar warning system on the aircraft attempts to map its environment so that it can detect danger and protect itself by jamming and other countermeasures. It treats the three transmitters as objects whose beams are to be mapped in accordance with the carrier frequency of each, the angle of arrival of signals at the aircraft, and perhaps other parameters. Each emitter produces many signals, and upon receipt at the aircraft the signals should be sorted according to the emitters that produce them. The environment changes continuously.

Figure 3:
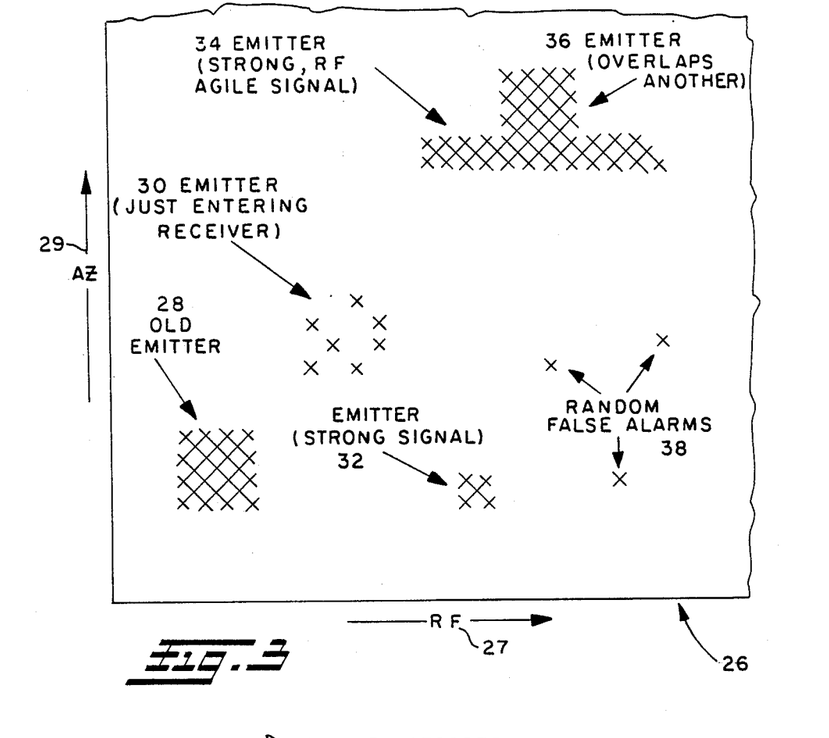
FIG. 3 shows, for the aircraft of FIG. 2, the concept of mapping of emitter (transmitter) information in two dimensions, namely azimuth and carrier frequency, illustrating signatures of different types of emitters.

FIG. 3 is a space map 26 similar to that of FIG. 1 but having more details in order to illustrate the mapped records or signatures of various types of emitters whose signals are received by an aircraft or missile. The parameters are the carrier frequency (RF) 27 and azimuth angle of arrival (Ax) 29 of the signals.

The signature 28 of an emitter that has been monitored for a relatively long time may be a solid block of contiguous pixels. It is not a single pixel because the noise of the environment limits the precision of measurement of the parameters, and the transmitter, receiver, and measurement apparatus may drift somewhat. Moreover the exact value may be on a boundary between two pixels. A record 30 of an emitter whose signals have only recently started to be received is spotty. A very strong signal having a high signal-to-noise ratio would be likely to involve fewer pixels than a weak one; the strong emitter record 32 occupies a $2 \times 2$ array of pixels.

A strong signal 34 from an emitter that changes frequency (RF agile) is spread across more pixels in the RF dimension than in the Az dimension. Another emitter signal 36 has frequency and azimuth almost equal to those of 34, and its pattern touches or overlaps the pattern of 34 in the mapping space. Random false alarms produce scattered records such as those depicted by 38.

It has been shown by statistical analysis and computer simulation that, to achieve good performance, not more than 10% of the image space defined by a RAM (or by the window field size in WAM or CAM) should be occupied. If the space has the two dimensions RF and Azimuth, each RAM work represents a pixel whose address has an upper and lower RF dimension and an upper and lower Az dimension in the image space. Analysis shows that an average of 5 pixels is required per emitter (typically 2 pixels in each dimension; sometimes $3 \times 3$ for weak signals), so that for 500 emitters at least $5 \times 500 \times 10 = 25,000$ RAM words are required. It is assumed that the emitters are "hash addressed" and Poisson distributed in the space.

To specify an emitter each RAM word must contain at least $\log_2 E$ bits, which is 9 bits for the 500 emitter example; (this differs from the requirements for a "blocking map", which is a prior-art use of RAMs as bit mapping devices). When a PDW "addresses" the RAM by RF and Az, the RAM can "output" the emitter identification number, if any, that was stored at that address. The output emitter number can immediately be employed as a pointer to access a conventional Emitter Beam File (see FIG. 4). The emitter pointer is appended to data of the corresponding PDW, and the data can then be preprocessed. Preprocessing usually includes averaging the parameter values expressed by the new data with previously received data for that emitter.

For the 500-emitter embodiment, a RAM capacity of 32K×12 bits was chosen. Four or more smaller RAM devices having capacities that sum to this total capacity are preferably employed, for reasons explained below. Provision in the RAM for twelve bits per word allows for the emitter number plus as many as three flag bits.

In a practical case, the RAM may require almost 7 times as many bits of storage as a CAM. Although a CAM would require many more bits per word to map the same geofrequency space, it would require storage space for only 500 sets of limits. RAMs are nevertheless more attractive for many applications because, for the foreseeable future, RAMs are expected to be more than 10 times as densely fabricated as CAMs or WAMs. RAMs are orders of magnitude less expensive per bit, and their power requirements are much lower.

Figure 4:
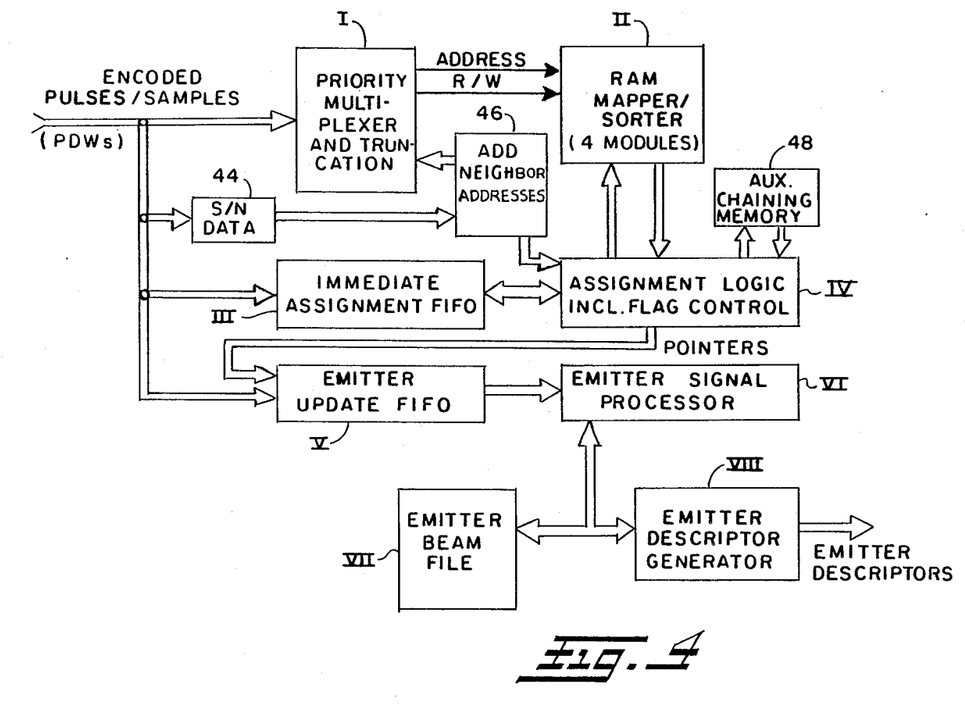
FIG. 4 is a block diagram of main functional subsections of a preferred embodiment of the invention for the sorting of received signals in dense signal environments.

The operation of a preferred embodiment of the invention can be seen by reference to FIG. 4, each of whose blocks is described in detail.

I. PRIORITY MULTIPLEXER

Functions

The Priority Multiplexer I of FIG. 4 receives encoded pulses (or samples of CW signals) in the form of pulse descriptor words (PDWs) from an airborne radio receiving system. The main function of the Priority Multiplexer I is to provide address and mode control data to the RAM Mapper/Sorter II. The PDWs are received in synchronism with a 10 MHz clock at a rate of up to 5 million PDWs per second. The Priority Multiplexer selects out the portions of the field of the PDW that correspond to radio frequency (RF) and azimuth (Az), for addressing random access memories (RAMs). It also provides addresses corresponding to contiguous RF and Az values contiguous to those of a received PDW by incrementing and decrementing the received values by amounts corresponding to one or more units or pixels.

Preferably, a standard technique called "hash addressing" is employed, in which the most significant bit or bits of the RF or Az data are omitted when addressing the RAM Mapper/Sorter II. The result of this truncation is overlaying of the map, in sections, as though the map had been cut into pages that are then stacked. The technique is well known. It results in more efficient utilization of the RAM Mapper/Sorter II at the risk of more overlapping of objects. The system is fully pipelined. The original PDW associated with each entry is preserved temporarily in shift registers outside the RAM, and joined with the emitter number that is later read from the RAM, so that the information contained in the bits that were omitted by hashing truncation is retrieved for Emitter Beam File VII purposes, described below.

At a minimum of each second clock time, the Priority Multiplexer I services "write commands" that are received from the "Assignment Logic" module IV, which is described below.

Apparatus

The architecture of the Priority Multiplexer is fully pipelined so that a throughout rate of up to 10 MHz (10 million RAM addresses per second) can be maintained, but, by means of holding registers between logic operations, a latency of many hundreds of nanoseconds can be accommodated. At the current state of the art, it is anticipated that a single application-specific integrated circuit will be sufficient to contain the elementary logic required for the Priority Multiplexer I.

Inputs and Outputs

The Priority Multiplexer I accepts from the receiver system the map address portion (15 bits of RF and Az plus two extra least significant bits) of the PDW and/or a "write" assignment from the Assignment Logic IV, to allow read or write of the RAM Mapper/Sorter II. It also receives other data from the PDW (pulse amplitude or signal-to-noise ratio) which is used to control the "forward binning" process (see II). The Priority Multiplexer I outputs address and mode commands to the RAM Mapper/Sorter II. (15 address bits plus "chip selects" etc.). The Priority Multiplexer I has two-way communication with the Assignment Logic block IV.

II. RAM MAPPER/SORTER

Function

The function of the RAM Mapper/Sorter II is to provide a digital map of the image space, divided into bins of pixels. As PDWs are received, the already-existing contents of the addressed pixel are examined and an emitter pointer number may be loaded when appropriate into the addressed pixel.

In this example, the map is two-dimensional and employs RF and Az angle of arrival co-ordinates. Clearly, elevation coordinates could be added and, for other applications such as industrial robots, RF could be replaced by some other parameter such as color, surface roughness of an object, etc. The number of dimensions that can be employed is not limited. However, it is assumed (due to the quantized pixel borders) that at least two words are required per dimension to store the location of an object. Assuming that the measurement or location has a significant rms uncertainty or probable error in any practical system, the minimum number of words required to store the "location" of an object in a space of d dimensions is $2^2$. Of course, if the object moves in the space the number of words required may be larger. Also, if the location measurements of some objects have more uncertainty more words may be required.

On the assumption that the space volume occupied by objects is no more than 10% of the total volume, for the two-dimensional case (and assuming an average of 5 words per object) the minimum number of RAM words required to perform the function adequately is $10 \times 5 \times 0_e$, where $0_e$ is the maximum number of objects expected in the image space.

Apparatus

The RAM Mapper/Sorter II can be implemented by a conventional random access memory device or devices, such as an ultra-low power complementary metal oxide semiconductor (CMOS) RAM. With 32K×8 RAMs on a single substrate, only two chips would be required to implement the 32K×12 RAM required for the example, which is an RF/Az mapper to store the geofrequency location of up to 511 emitters employing 9 emitter pointer bits plus up to 3 flag bits per emitter.

However, by employing four or more separate integrated circuits for the RAM, all four pixels that are required as a minimum in the two-dimensional case to store an object (e.g., radar emitter) can be accessed in parallel for reading or writing purposes. This allows the use of smaller RAM devices operating at somewhat reduced clock rates, since four times as many pixels can be accessed per clock cycle.

For many applications this memory intensive approach is superior to computation or logic intensive approaches which require high-power, very high clock rate special devices such as WAMs or CAMs for reasons given above. Note that if a CAM or WAM array is substituted for the RAM Mapper/Sorter II, performance is identical in all important respects.

As explained above, the RAM clock rate required for the example is well under 10 MHz with a total average input rate of up to 5 million PDWs per second. Monte Carlo simulation indicates that an actual rate of less than 5.5 MHz will be sufficient.

A desirable feature that can be adapted for use in this invention and which is available in some current RAM devices, particularly VHSIC types, is a "master clear" capability. This allows the map to be cleared in one or a few clock cycles when the apparatus is operating in a "snapshot" mode, which is a requirement for many quasi- or non-real time applications.

Binning Approaches

Two approaches were devised for binning. The first employs "immediate backward binning". See FIG. 4 and reference numeral 46. With this approach each PDW is immediately used as an address to determine whether its principal addressed pixel (and perhaps nearest neighbors in the RF/Az space) are occupied. If not, the principally addressed pixel is loaded, i.e., an emitter beam number or pointer is written into that address of the RAM Mapper/Sorter II. If the principally addressed pixel is not already occupied by an emitter pointer and a contiguous RF/Az neighboring pixel is occupied, the pointer that is in that neighbor can be written also into the principal addressed pixel. With immediate backward binning one pixel at a time is loaded.

A pixel and its near neighbors are loaded immediately (without transit through the FIFO), if a PDW addresses an empty pixel having empty neighbors.

The second binning approach devised, which is preferred, is "delayed forward binning". Pulse descriptors are loaded into a FIFO (first in, first out) memory so that the sorting RAM can be operated at a lower rate during an initial transient interval, for example, when the system is first turned on in a dense environment. To minimize the necessary total number of delayed "reads" (which affects the required FIFO length), a pixel or group of pixels is loaded immediately with an emitter pointer if a pulse descriptor word points to an empty cell having empty RF/Az neighbors.

At each RF/Az bit location, a word stating an assigned emitter number (pointer) is written, if no emitter pointer was discovered there upon reading the location in response to an pulse descriptor word.

If upon reading, a location is found to contain an emitter pointer already, the new and old emitter pointers are compared, and if they different, a special procedure is employed. This situation may rise because two emitter patterns are overlapping in the RAM mapping space. One approach to preserving all of the important information in such a situation is to provide a second RAM to accommodate overlying emitter pointers.

A different and preferred approach, however, is to provide ancillary data storage means 48 for storing one or more additional emitter pointers for only those addresses for which this overlap situation arises. Upon reading an address and finding it already occupied, the system records the congested address and all of the pointers or all of the additional pointers corresponding to it, in a chaining procedure of a type which is well known. All of the pointers associated with an address are subsequently recognizable, which enables identifying overlapping emitters.

The apparatus may if desired include address generating equipment 44, 46 that generates a wider pattern of contiguous addresses for a weak signal or one of poor signal to noise ratio that it generates for a strong well defined signal. This involves receiving, preferably as part of the PDW, data indicating the signal strength or degree of uncertainty of the RF and Az parameter values.

The indicating data are compared with a threshold level; those PDWs whose parameters are more certain than the threshold are assigned small "blob" sizes near the principal address, and those less certain have larger sizes. For example strong signals may result in address a $2 \times 2$ pixel array and weak ones a $3 \times 3$ array.

The delayed forward binning approach is preferred because it minimizes the size of the RAM Mapper/Sorter II. Pipelined computation techniques can minimize the size of the FIFOs described below.

Inputs and Outputs

A conventional RAM input/output arrangement can be employed. In the example this would include 15 address lines, chip select lines, a read/write mode line, etc. The word output when reading and the word input when writing into the RAM Mapper/Sorter II are multiplexed on one set of 12 wires, for exchanging 12 bit words. The RAM communicates with the Priority Multiplexer I and the Assignment Logic block IV.

III. IMMEDIATE ASSIGNMENT FIFO

Functions

The complexity of the logic associated with the Immediate Assignment FIFO III is determined by the organization of the RAM Mapper/Sorter II. The preferred approach is to employ a minimum of four RAM devices for the Mapper/Sorter so that all four pixels (in a two-dimensional mapping case) associated with a strong potential emitter location in the RAM are read in parallel when a PDW arrives. If all four pixels are clear, an immediate initial assignment of an emitter number is made in all four pixels upon the next free clock cycle in the processing pipeline. In this case, the Immediate Assignment FIFO III acts merely as a set of holding registers for complete PDWs. The emitter number is appended to the PDW in the Immediate Assignment FIFO III.

Once an emitter number assignment is made, the complete PDW with the emitter number appended to it can be processed by the Emitter Signal Processor VI for storage in the Emitter Beam File VII. A second FIFO can be employed as further intermediate storage to accommodate the initial transients when a large processing load is suddenly presented to the preprocessor as a map is starting to be formed.

In the situations which produce five million PDWs per second from 500 emitters, more than 80% of these PDWs would be likely to be from high duty factor emitters such as pulse Doppler radars. They represent, by far, the highest load on the system, and most of their PDWs are redundant. Since only a few such emitters are present, a special technique can be employed to block most of their PDWs from storage until initial PDWs of other emitters can be processed. No harm is done by blocking them, since more than enough PDWs are available from pulse Doppler emitters to enable them to be recognized.

On initial assignment of an emitter number to four pixels in the map, (i.e., four words in the RAM Mapper/Sorter II), the Immediate Assignment FIFO III is employed as a time ordered file. That is, it acts as a digital delay line with a programmable latency.

For example, suppose a pulse Doppler emitter is defined as any emitter with a pulse repetition interval of less than 50 microseconds. The FIFO III is then programmed to have a 50 microsecond delay from input to output. The PDW initiates an entry into the RAM II, and at the same time (but pipelined) the PDW is entered into the Immediate Assignment FIFO III. If the addressed pixel in the RAM is empty, a "potential pulse Doppler" flag is set in that pixel. Up to 50 microseconds can be employed to process the potential new pulse descriptor word (including the assignment of a new emitter number). If another PDW having the same parameters has not been received from the receiving system by the time the first PDW has emerged from the output of the Immediate Assignment FIFO III (50 microseconds later) the RAM Mapper/Sorter II is accessed via the Assignment Logic block IV to change the initial assignment flag to a "non-PD flag". This indicates that the emitter is not a pulse Doppler emitter.

If another PDW arrives which accesses the same map location of the RAM II before the end of the 50 microsecond delay interval, the emitter is presumed to be a pulse Doppler type. In other words, if another pulse descriptor word arrives and reads the same pixel before the flag is reset to non-pulse Doppler, a special processing path is established (not involving the normal "leakage FIFO"). The flag is then changed to a "block PD" flag, and the first and second PDWs for this emitter are placed in the Emitter Update FIFO V. From there they go to the Emitter Signal Processor VI.

Thus, in the pulse Doppler case, the Emitter Signal Processor VI receives only the first two PDWs from the emitter, which are sufficient to establish the emitter's pulse repetition interval. Subsequent pulses from that emitter are blocked until an update is commanded. After two PDWs are received from each pulse Doppler emitter, more than 80% of the incoming PDWs can be immediately blocked by means of appropriate flag bits in the RAM Mapper/Sorter II. This reduces the processing load on subsequent functions to less than one million PDWs per second, even during an initial transient interval such as turn-on of the apparatus in a dense environment.

Typically, PDWs from all non-pulse Doppler emitters are placed in the Emitter Update FIFO V until the processor has received at least 6 PDWs for fixed pulse repetition interval emitters. In the steady state, the processing rate for all parts of the apparatus except the Priority Multiplexer I and the RAM Mapper/Sorter II, is determined by the number of new emitter beams detected each second, the requested update rate (which is controlled by the Emitter Signal Processor VI) and the "leakage" rate of PDWs.

Leakage PDWs are PDWs which "escape" (fail to fall within) the borders established for their emitters in the RAM Mapper/Sorter II due to measurement errors or noise. The leakage was less than 2% (100,000 PDWs/second in the example) under the map design assumptions employed in a practical simulation that was performed.

A pixel size equal to 4 standard deviations (sigma) of the data for strong signals is employed, so that the actual RF/Az parameters, which represent the true location of an emitter signal, cannot be more than 2 sigma from a pixel boundary. A $2 \times 2$ rectangle of pixels represents a strong signal location. If it can be assumed that a pixel can be 2 sigma in extent for strong signals, a $3 \times 3$ array of pixels can appropriately be employed for weak signals. Signal strength information in the PDW is employed to control the dimensions, expressed in pixels, of the map representation of an object that is entered in response to the PDW. With this approach, leakage can be as small or smaller for weak signals as for strong.

Note that a time ordered file can be implemented in many ways, and the technique chosen in this embodiment is not critical to the invention.

Apparatus

Complete single device FIFOs are commercially available. Also, techniques are well known for creating FIFOs by using conventional RAMs and address counters. The length required is determined by a queueing analysis which depends upon the application.

Inputs and Outputs

The Immediate Assignment FIFO III communicates with the receiving system for receiving PDWs and with the Assignment Logic block IV for exchange of data and commands. Both of the FIFOs (III and V) receive complete PDWs plus emitter numbers and appropriate flag bits from the Assignment Logic IV and/or the RAM Mapper/Sorter II.

IV. ASSIGNMENT LOGIC

Function

The Assignment Logic block IV performs an essentially memory intensive function. It monitors the flags that are read from the RAM Mapper/Sorter II. When there are no flags, which indicates that the incoming PDW came from a new emitter, the Assignment Logic block provides an available emitter number. In the present example an emitter number has 9 bits, and may be a new or reused number. The Assignment Logic block IV also changes the flag bits, by writing into the RAM Mapper/Sorter II to indicate the current status of the emitter.

Apparatus

A preferred way of implementing the Assignment Logic block IV for providing the emitter number to the mapper is a push-down stack of LIFO (last in, first out) device. The stack initially contains emitter numbers from (in this example) 1–511, which pop up (are read) as emitter numbers are required to be assigned. If desired, zero can be used in place of a flag to indicate an empty location in the RAM Mapper/Sorter II. When a previously used number becomes available, for example when an emitter leaves the environment, its number can be placed back on the LIFO stack.

In continuous operation, such as in the electronic warfare application in which the apparatus is on a vehicle, the stack will get scrambled. However, it is a simple routine matter to review automatically the contents of the Assignment Logic stack IV and the Emitter Beam File VII periodically to ensure that no numbers are missing and that there are no duplications.

Inputs and Outputs

For this application the inputs and outputs of the Assignment Logic block IV include the 12 bit words going to or from the RAM Mapper/Sorter II and to or from the Immediate Assignment FIFO III. The Assignment Logic block IV also communicates with the Priority Multiplexer I, to transfer write commands. Of course, as with all of the blocks of FIG. 4, additional routine clock signals, power inputs, test signals, etc., are required.

V. EMITTER UPDATE FIFO

Function

The Emitter Update FIFO V is merely a storage pipeline or digital memory which holds PDWs and auxiliary data regarding old emitters that are to be updated, and from new emitters until the Emitter Signal Processor VI is able to receive them.

Apparatus

This function can be implemented by direct memory access to the Emitter Signal Processor's data memory. Thus this function can be subsumed into the Emitter Signal Processor's functions, if the Emitter Signal Processor's direct memory access apparatus has adequate input rate capability. In general, since a machine having an instruction rate of less than 1 million instructions per second can be employed as the Emitter Signal Processor VI for processing signals in this example, the Emitter Updata FIFO V is preferably a separate piece of hardware.

Inputs and Outputs

In the assumed case, in which the RAM Mapper/Sorter II can access at least 4 pixels in parallel, the input and output requirements of the Emitter Update FIFO V are routine and similar to those of the Immediate Assignment FIFO III.

VI. EMITTER SIGNAL PROCESSOR

Functions

In the present example, the Emitter Signal Processor VI performs the usual functions required to convert PDWs to emitter descriptor words. Basically this consists of grouping PDWs and averaging their parameters, such as frequency. Each emitter's pulse repetition interval or pattern of pulse repetition intervals is determined here by differencing successive PDW time-of-arrival data.

Apparatus

A conventional programmable microprocessor (i.e., a microminiature computer) can be employed in the present example. The throughput rate requirements are easy to fulfill with currently available ultra-low power CMOS devices like those employed in low cost personal computers. This is because, due to the action of the RAM Mapper/Sorter II and its peripheral functions, only about 6 PDWs from each emitter currently in the environment need be input to the Emitter Signal Processor VI, which represents a total of only about 3,000 PDWs in the present example. PDWs from new emitters are immediately input, so, in spite of the low throughput rate requirements, reaction time is quick. Reaction time is within about 7 pulse repetition intervals for most emitters and within one or two pulse repetition intervals for special emitters that are programmed to have high priorities.

Inputs and Outputs

The inputs to the Emitter Signal Processor VI are PDWs (including emitter numbers), and the outputs are emitter descriptor words. The Emitter Signal Processor communicates with the rest of the apparatus and externally by means of a conventional set of data buses, whose detail depend upon the application and are well known to those versed in the art of embedded processors.

VII. EMITTER BEAM FILE AND
VIII. EMITTER DESCRIPTOR GENERATOR

Functions

The Emitter Beam File VII is merely a section of the Emitter Signal Processor's (VI) data memory that is reserved for storing averages of emitter data (i.e., averaged PDWs). The Emitter Descriptor Generator VIII performs a simple formatting function to put the data gathered regarding each emitter into a form suitable for display or for transfer to a post-processor. (More generically, as in a robot or inspection application of the invention, the word "object" could be substituted for "emitter".)

Note that, unlike in a conventional sorter, the Emitter Beam File VII is immediately accessed, with no search required, by means of the emitter number appended to the PDW. Of course, there will be ambiguities due to overlaps, which must be resolved by the Emitter Signal Processor VI. This is easily accomplished by a routine chaining procedure, which links ambiguous emitter numbers to numbers that are newly assigned by the Assignment Logic block IV.

Apparatus

Although they are shown as separate functions, the roles of blocks VII and VIII are subsumable in the functions of the Emitter Signal Processor VI.

Inputs and Outputs

In a preferred case, in which these functions are performed within the Emitter Signal Processor VI, the inputs and outputs are similar to those of the Emitter Signal Processor.

To avoid clutter, detailed interconnections between functional blocks are omitted from the diagram if they are well known.

Figure 5:
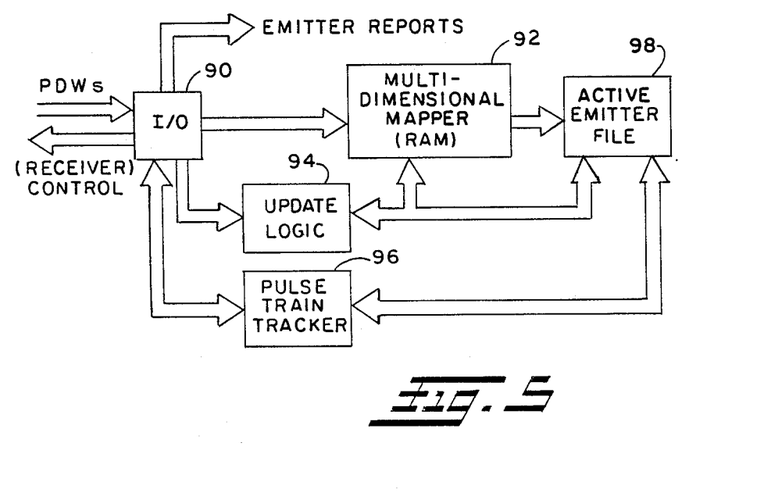
FIG. 5 is a simplified block diagram of the architecture of an embodiment of the invention that is a composite of special-purpose hardware and computer components.

FIG. 5 shows in block diagram form an embodiment of the invention that utilizes both special-purpose hardware and computer components. The system is of the type described in great detail above in connection with FIG. 4; FIG. 5 is included merely to show in a conventional drawing format, the preferred computer architecture. It includes input/output equipment 90, which receives PDWs from receiver signal system measurement apparatus. The conventional I/O equipment 90 communicates with the multi-dimensional RAM Mapper/Sorter 92, with the Update Logic 94, and with the Multiple Pulse Train Tracker module 96, (which can use CAMs). If desired the I/O 90 can also send signals back to the receiving system (including antenna) apparatus to control it.

The RAM 92 communicates with an Active Emitter File 98 which in turn communicates with the Update Logic 94 and the Multiple Pulse Train Tracker module 96.

We claim:

1. In a system for classifying a plurality of emitters of signals on the basis of the values of selected parameters of the signals, which receives signals of the emitters and measures at least first and second parameters of them, a sorter for sorting the signals in accordance with the identities of their emitters, comprising:

RAM means having data storage locations that are addressable by multi-dimensional address sets for storing emitter-identifying pointers, a first dimension of each address set corresponding to a first parameter of such a signal and a second dimension of each address set corresponding to a second parameter of such a signal;

means responsive to receipt of a signal that is to be sorted, for addressing said RAM by using its first and second parameters to read the contents of said address, including an emitter pointer if present, from a principally addressed storage location whose address corresponds to said first and second parameters;

means responsive to said reading means for writing a fresh emitter pointer into at least the principally addressed storage location when it is found upon reading to be empty;

means for transmitting at least the first and second parameters of said signal and the corresponding emitter pointer to data processing apparatus;

and wherein said means for addressing said RAM by using its first and second parameters to read the contents of a principally addressed storage location further comprises means for addressing said RAM to read the contents of a predetermined array of other storage locations that correspond to neighboring values of said first and second parameters;

and wherein said means for writing further comprises means for writing said fresh emitter pointer into also at least one of said other storage locations of said predetermined array;

and wherein said means for transmitting further comprises means for transmitting also the address of said other storage locations into which said fresh emitter pointer was written.

2. A sorter as defined in claim 1 and wherein said means for addressing said other storage locations comprises means for incrementing and decrementing said values of first and second parameters by at least one address unit.

3. A sorter as defined in claim 1 and wherein said means for addressing further comprises means for receiving ancillary signal data indicative of the certainty of the value of at least one of said first and second parameters, and means for predetermining said predetermined array of other storage locations differently for differing levels of certainty of said value.

4. A sorter as defined in claim 1 and wherein said means for writing a fresh emitter pointer further comprises means for writing said fresh emitter pointer into also those of said predetermined array of other storage locations that are found to be empty.

5. A sorter as defined in claim 1 and wherein said RAM means comprises at least three separate RAM storage devices and, of said storage locations comprising said principally addressed storage location and said other storage locations, at least three storage locations are in different ones of said three separate RAM storage devices, and wherein said means for addressing comprises means for addressing all three locations substantially simultaneously.

6. A sorter as defined in claim 11 and wherein said means for writing a fresh emitter pointer further comprises means for writing said fresh emitter pointer into also those of said other storage locations of said predetermined array that are found to be empty.

7. In a system for classifying a plurality of emitters of signals on the basis of the values of selected parameters of the signals, which received signals of the emitters and measures at least first and second parameters of them, a sorter for sorting the signals in accordance with the identities of their emitters, comprising:

RAM means having data storage locations that are addressable by multi dimensional address sets for storing emitter-identifying pointers, a first dimension of each address set corresponding to a first parameter of such a signal and a second dimension of each address set corresponding to a second parameter of such a signal;

means responsive to receipt of a signal that is to be sorted, for addressing said RAM by using its first and second parameters to read the contents of said address, including an emitter pointer if present, from a principally addressed storage location whose address corresponds to said first and second parameters;

means responsive to said reading means for writing a fresh emitter pointer into at least the principally addressed storage location when it is found upon reading to be empty;

means for transmitting at least the first and second parameters of said signal and the corresponding emitter pointer to data processing apparatus;

and further comprising:

a delay means that also receives said signal that is to be sorted, for retention during a predetermined delay interval;

and wherein said means for writing a fresh emitter pointer into at least the principally addressed storage location further comprises means for writing also a first flag into that location;

and further comprising means for replacing said first flag with a second flag signifying a pulse Doppler emitter if a another signal is received from that emitter before said predetermined delay interval elapses, and;

wherein said means for transmitting further comprises means for transmitting also at least the first and second parameters of said other signal to said data processing apparatus.

8. A sorter as defined in claim 7 and wherein said delay means for retaining during a predetermined delay interval comprises means for programmably altering the extent of said delay interval.

9. A sorter as defined in claim 7 and further comprising: means for blocking the further processing of subsequently received signals from that pulse Doppler emitter in response to said second flag.

10. In a system for classifying a plurality of emitters of signals on the basis of the values of selected parameters of the signals, which receives signals of the emitters and measures at least first and second parameters of them, a sorter for sorting the signals in accordance with the identities of their emitters, comprising:

RAM means having data storage locations that are addressable by multi-dimensional address sets for storing emitter-identifying pointers, a first dimension of each address set corresponding to a first parameter of such a signal and a second dimension of each address set corresponding to a second parameter of such a signal;

means responsive to receipt of a signal that is to be sorted for addressing said RAM using its first and second parameters to read the contents of said address, including an emitter pointer if present, from a principally addressed storage location whose address corresponds to said first and second parameters;

means responsive to said reading means for writing a fresh emitter pointer into at least the principally addressed storage location when it is found upon reading to be empty;

means for transmitting at least the first and second parameters of said signal and the corresponding emitter pointer to data processing apparatus;

and wherein said means for addressing said RAM further comprises means for interdicting at least the most significant bit of at least one of said first and second parameters before addressing said RAM, and for addressing the RAM with the remaining truncated parameter data, to overlay in said RAM, sections of the space represented by said first and second parameters, and further comprises ancillary storage means for retaining temporarily said interdicted bits; and wherein said means for transmitting further comprises means for recombining said interdicted bits with said truncated remaining data to transmit complete first and second parameters to said data processing apparatus.

11. A sorting method for use in a system for classifying a plurality of emitters of signals on the basis of the values of selected parameters of the signals, which receives signals of the emitters and measures at least two selected parameters that characterize the signals, for sorting the signals in accordance with the identities of their emitters, comprising the steps of:

receiving values of at least first and second selected parameters of a signal that is to be sorted;

providing a RAM having data storage locations that are addressable by multi-dimensional address sets for storing emitter-identifying pointers, a first dimension of each address set corresponding to a first parameter of such a signal and a second dimension of each address set corresponding to a second parameter of such a signal;

in response to receipt of a signal that is to be sorted, addressing said RAM by using the signal's first and second parameters, to read the contents of said address, including an emitter pointer if present, from a principally addressed storage location whose address corresponds to said first and second parameters;

producing indication as to whether or not said addressed location contains an emitter pointer;

writing a fresh emitter pointer into at least the principally addressed storage location when it is found upon reading to be empty;

providing said emitter pointer in conjunction with said signal parameters to data processing apparatus;

and wherein said step of addressing further comprises addressing said RAM to read the contents of a predetermined array of other storage locations that correspond to neighboring values of said first and second parameters;

and wherein said step of writing further comprises writing said fresh emitter pointer into also at least one of said other storage locations of said predetermined array;

and wherein said step of providing said emitter pointer further comprises providing also said emitter pointer in conjunction with the addresses of said other storage locations into which said fresh emitter pointer was written.

12. A sorting method as defined in claim 11 and wherein said step of addressing further comprises addressing said other storage locations by incrementing and decrementing said values of first and second parameters by at least one address unit.

13. A sorting method as defined in claim 11 and wherein said step of addressing further comprises receiving ancillary signal data indicative of the certainty of the value of at least one of said first and second parameters, and predetermining said predetermined array of other storage locations differently for differing levels of certainty of said value.

14. A sorting method as defined in claim 11 and wherein said step of writing a fresh emitter pointer comprises writing said fresh emitter pointer into those of said predetermined array of other storage locations that are found to be empty.

15. A sorting method as defined in claim 11 and wherein said step of providing a RAM comprises providing at least three separate RAM storage devices and in which, of said storage locations comprising said principally addressed storage location and said other storage locations, at least three storage locations are in different ones of said three separate RAM storage devices; and wherein said step of addressing comprises a step of addressing all three locations substantially simultaneously.

16. A sorting method as defined in claim 11 and wherein said step of writing a fresh emitter pointer further comprises a step of writing said fresh emitter pointer into also those of said other storage locations of said predetermined array that are found to be empty.

17. A sorting method as defined in claim 11 and further comprising:

providing a delay means that also receives said signal that is to be sorted, for retention therein during a predetermined delay interval; and wherein said step of writing a fresh emitter pointer into at least the principally addressed storage location further comprises a step of writing also a first flag into that location;

and further comprising a step of replacing said first flag with a second flag signifying a pulse Doppler emitter if a another signal is received from that emitter before said predetermined delay interval elapses; and, wherein said step of transmitting further comprises a step of transmitting also at least the first and second parameters of said other signal to said data processing apparatus.

18. A sorting method as defined in claim 17 and wherein said delay step of retaining during a predetermined delay interval comprises a step of programmably altering the extent of said delay interval.

19. A sorting method as defined in claim 17 and further comprising:
a step of blocking the further processing of subsequently received signals of that pulse Doppler emitter in response to said second flag.

20. A sorting method for use in a system for classifying a plurality of emitters of signals on the basis of the values of selected parameters of the signals, which receives signals of the emitters and measures at least two selected parameters that characterize the signals, for sorting the signals in accordance with the identities of their emitters, comprising the steps of:
receiving values of at least first and second selected parameters of a signal that is to be sorted;
providing a RAM having data storage locations that are addressable by multi-dimensional address sets for storing emitter-identifying pointers, a first dimension of each address set corresponding to a first parameter of such a signal and a second dimension of each address set corresponding to a second parameter of such a signal;
in response to receipt of a signal that is to be sorted, addressing said RAM by using the signal's first and second parameters, to read the contents of said address, including an emitter pointer if present, from a principally addressed storage location whose address corresponds to said first and second parameters;
producing indication as to whether or not said addressed location contains an emitter pointer;
writing a fresh emitter pointer into at least the principally addressed storage location when it is found upon reading to be empty;
providing said emitter pointer in conjunction with said signal parameters to data processing apparatus;
and wherein step of addressing said RAM further comprises:
a step of interdicting at least the most significant bit of at least one of said first and second parameters before addressing said RAM, and of addressing the RAM with the remaining truncated parameter data, to overlay in said RAM, sections of the space represented by said first and second parameters; and further comprises
an ancillary storage step of retaining temporarily said interdicted bits; and wherein
said step of transmitting further comprises means a step of recombining said interdicted bits with said truncated remaining data to transmit complete first and second parameters to said data processing apparatus.

21. A sorting method for use in a system for classifying a plurality of emitters of signals on the basis of the values of selected parameters of the signals, which receives signals of the emitters and measures at least two selected parameters that characterize the signals, for sorting the signals in accordance with the identities of their emitters, comprising the steps of:
receiving values of at least first and second selected parameters of a signal that is to be sorted;
providing a RAM having data storage locations that are addressable by multi-dimensional address sets for storing emitter-identifying pointers, a first dimension of each address set corresponding to a first parameter of the signal and a second dimension of each address set corresponding to a second parameter of the signal;
in response to receipt of a signal that is to be sorted, addressing said RAM to read stored emitter pointers when they are present from a principally addressed storage location whose address corresponds to said first and second parameters and from a predetermined array of other storage locations that correspond to neighboring values of said first and second parameters, to read contents if present of said addresses, including emitter pointers;
producing indications as to whether or not said addressed locations contain emitter pointers;
writing an old emitter pointer into at least the principally addressed storage location of upon reading it is found to be empty and said old emitter pointer is found in at least one of the other storage locations of said predetermined array;
transmitting at least the first and second parameters of said signal and the corresponding old emitter pointer to data processing apparatus.

* * * * *